United States Patent
Olshansky

(10) Patent No.: US 6,493,437 B1
(45) Date of Patent: Dec. 10, 2002

(54) ADVERTISING-SUBSIDIZED PC-TELEPHONY

(75) Inventor: Robert Olshansky, Wayland, MA (US)

(73) Assignees: Genuity Inc., Burlington, MA (US); Verizon Corporate Services Group Inc., New York, NY (US)

( * ) Notice: Subject to any disclaimer, the term of this patent is extended or adjusted under 35 U.S.C. 154(b) by 0 days.

(21) Appl. No.: 09/559,135

(22) Filed: Apr. 26, 2000

(51) Int. Cl.[7] .................. H04M 15/00; H04L 12/56
(52) U.S. Cl. ............... 379/114.13; 379/114.03; 379/114.12; 379/116; 379/121.02; 379/144.01; 379/900; 370/356
(58) Field of Search .................. 379/111, 112, 379/113, 114, 115, 140, 154, 155, 90.01, 93.01, 93.17, 93.23; 705/14; 370/356, 410

(56) References Cited

U.S. PATENT DOCUMENTS

| | | | | |
|---|---|---|---|---|
| 4,850,007 A | * | 7/1989 | Marino et al. | 379/67.1 |
| 5,448,625 A | * | 9/1995 | Lederman | 379/67.1 |
| 5,793,851 A | * | 8/1998 | Albertson | 379/114 |
| 5,953,398 A | * | 9/1999 | Hill | 379/112 |
| 5,987,108 A | * | 11/1999 | Jagadish et al. | 379/114 |
| 5,987,424 A | * | 11/1999 | Nakamura | 705/14 |
| 6,205,432 B1 | * | 3/2001 | Gabbard et al. | 705/14 |
| 6,298,056 B1 | * | 10/2001 | Pendse | 370/352 |
| 6,301,342 B1 | * | 10/2001 | Ander et al. | 379/114.13 |
| 6,337,858 B1 | * | 1/2002 | Petty et al. | 370/356 |

FOREIGN PATENT DOCUMENTS

| | | | | |
|---|---|---|---|---|
| EP | WO97/03410 | * | 1/1997 | G06F/17/60 |
| WO | WO 00/51332 | * | 8/2000 | H04M/11/00 |

OTHER PUBLICATIONS

*http://www.dialpad.com* (Nov. 8, 1999), 16 pages.

* cited by examiner

*Primary Examiner*—Binh Tieu
(74) *Attorney, Agent, or Firm*—Leonard Charles Suchyta; James K. Weixel

(57) ABSTRACT

A system subsidizes telephone calls over a network. The system includes a service provider 120 that establishes a telephone call between a calling party terminal 130 and a called party terminal 140 over the network 110. During the telephone call, the service provider causes at least one advertisement 312 to be displayed at the calling, or called party terminal. At any time during, or after, the telephone call, the service provider generates a bill based on a subsidized billing rate related to the display of the at least one advertisement.

28 Claims, 5 Drawing Sheets

ADVERTISING-SUBSIDIZED PC-TELEPHONY

FIELD OF THE INVENTION

The present invention relates generally to telecommunication systems and, more particularly, to a system and method for subsidizing PC-based telephony service.

BACKGROUND OF THE INVENTION

The provision of long distance telephone service is very competitive in today's marketplace. Presently, long distance telephone calls are typically provided by an Inter-eXchange Carrier (IXC). This IXC charges the consumer a per-minute fee for placing long distance calls.

An emerging service is IP-based telephony from a personal computer (PC), known as Voice over Internet Protocol (VoIP), in which the subscriber places an outgoing telephone call over a network, such as the Internet, from his PC. In general, the caller subscribes to VoIP service and is charged a per-minute usage fee associated with the long distance call.

Because of intense competition, there is a continuing need for telecommunication companies to reduce the cost of existing telecommunications services.

SUMMARY OF THE INVENTION

Systems and methods consistent with the present invention address this need by providing a mechanism through which the charges for telephone calls can be reduced or eliminated.

A method consistent with the present invention includes authorizing, via a service provider, telephone services over a data network to a client terminal. The service provider establishes a telephone call between the client terminal and a receiving terminal over the data network. During the telephone call, at least one advertisement is displayed at the client terminal. Upon termination of the telephone call, the service provider calculates a bill based on a subsidized billing rate.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide a mechanism through which callers may obtain telephone service at a subsidized rate. The subsidized rate can be accomplished in several ways. For example, the price-per-minute of the call can be reduced based on the number of advertisements viewed by the caller, it may be further reduced if the called party agrees to accept advertising prior to receiving the call, or alternatively, the call may be subsidized by the prior banking of free minutes by either the calling party or the called party.

A service provider authorizes access to the subsidized telephone service to a caller by authenticating the caller's provided identifier and password. Upon authorization, the service provider establishes a call from the caller's terminal to a called terminal. During the call, at least one advertisement is displayed at the client terminal. Upon termination of the call, the service provider calculates a bill based on a subsidized billing rate and bills the caller.

It is noted that the system disclosed herein is also capable of handling subsidized collect calls. For collect calling, the calling terminal is not required to have an account with the service provider, but rather the service provider determines if the called party has a valid account. If the called party has a valid account, the service provider initiates the call and awaits acknowledgement from the called terminal. Upon acknowledgement and acceptance of the collect call by the called terminal, the service provider completes connection of the call. At that time at least one advertisement is displayed on the called terminal. Upon termination of the call, the service provider calculates a bill based on a subsidized billing rate and bills the called party.

Exemplary System Configuration

Figure 1:
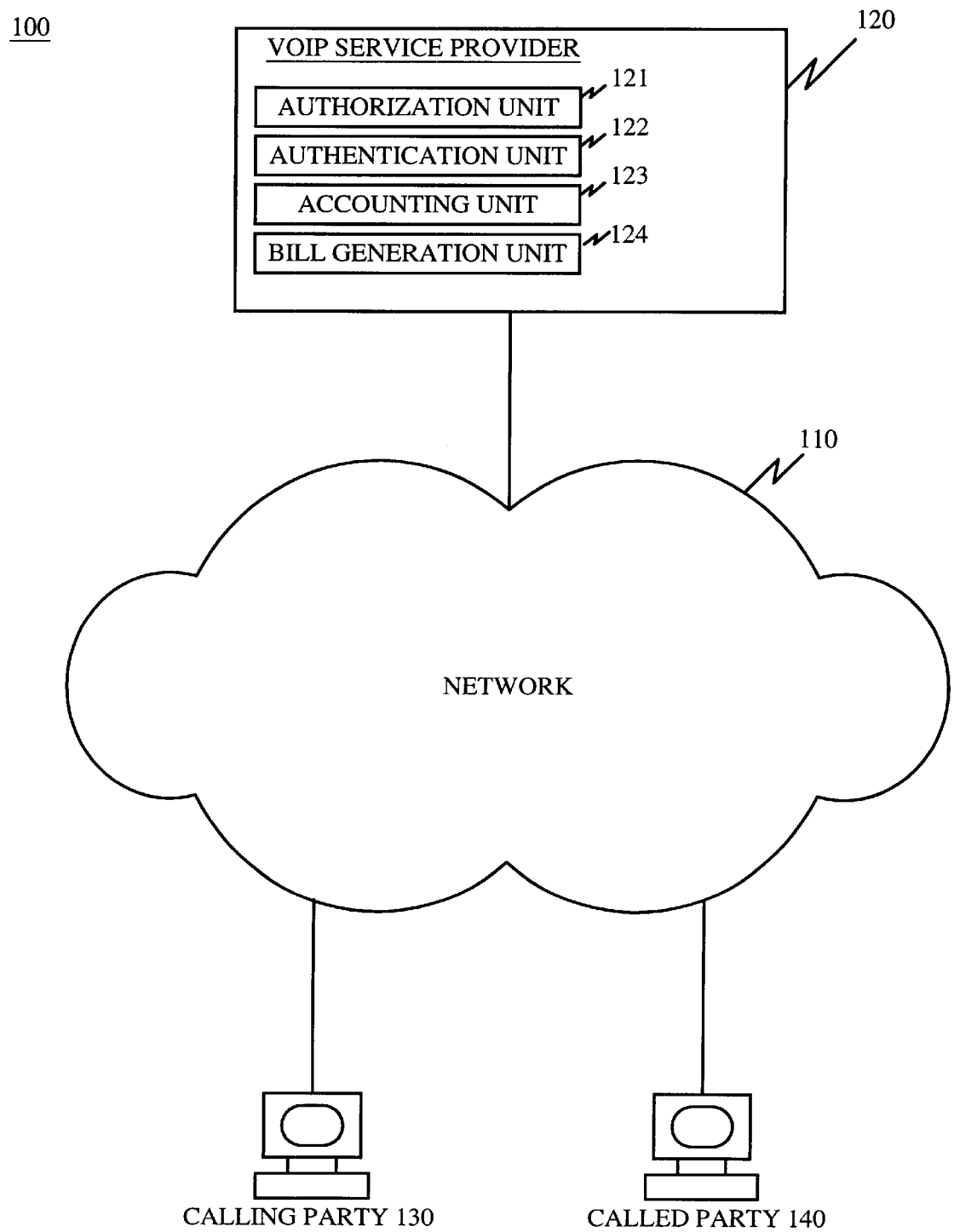
FIG. 1 illustrates an exemplary network in which a method for providing subsidized telephone service consistent with the present invention may be implemented.

FIG. 1 illustrates an exemplary system 100 in which a method for providing subsidized telephone service consistent with the present invention may be implemented. The system 100 includes a network 110 through which a calling party terminal 130, a called party terminal 140, and a VoIP service provider 120 communicate. It will be appreciated that the system 100 may include additional devices, such as a gateway, that aid in the receiving, transmitting or processing of data.

The network 10 may be any type of network, such as any LAN, WAN, intranet, or the Internet. Calling party terminal 130 and called party terminal 140 may be any type of computer system, such as a personal computer, laptop, or personal digital assistant (PDA), that allows for communication via the network 110. The calling party terminal 130 and the called party terminal 140 may be web enabled telephones such as the Qualcomm QCP 860 Thin Phone™. A calling party terminal 130 and called party terminal 140 consistent with the present invention include conventional mechanisms that convert voice signals to digital data, and vice versa.

It will be appreciated that the called party terminal 140 may be implemented as a conventional telephone. In such an event, the system 100 would include additional circuitry to convert voice signals from a conventional telephone to digital data for transmission through the network 110, and vice versa. It will be further appreciated that the calling party and called party terminals 130 and 140 may communicate with VoIP service provider 120 over the network 110 via a wired or wireless connection.

The VoIP service provider 120 includes an authorization unit 121, an authentication unit 122, an accounting unit 123, and a bill generation unit 124. The authorization unit 121 compares an identifier provided by a calling party, such as calling party 130, to a registered list of identifiers to determine whether the calling party is authorized to use the service provider's VoIP services. The authentication unit 122 authenticates the identity of a calling party by comparing a password provided by the calling party 130 to a password stored at VoIP service provider 120. The accounting unit 123 tracks such information that is necessary for billing the calling party for the telephone call. For example, the accounting unit 123 may track the duration and bandwidth of the call made using the services of VoIP service provider 120. Upon termination of the call, the accounting unit 123 calculates the appropriate charge for the telephone call, if any, and passes the result to the bill generation unit 124. The bill generation unit formats the billing information and displays it on the calling party terminal 130, or on the called party terminal 140 if the placed call was a collect call. Alternatively, the billing information can be sent to the calling, or called, party by another means such as email, fax, or mailed statement. It will be appreciated that the authorization unit 121, authentication unit 122, the accounting unit 123, and the bill generation unit 124 may be implemented via hardware or software and may be implemented as separate units, as illustrated in FIG. 1, or integrated into a single device.

A single VoIP service provider 120 has been shown for simplicity. It will be appreciated that a typical system 100 would include multiple service providers 120, calling party terminals 130, and called party terminals 140.

Exemplary Voiwp Service Provider Configuration

Figure 2:
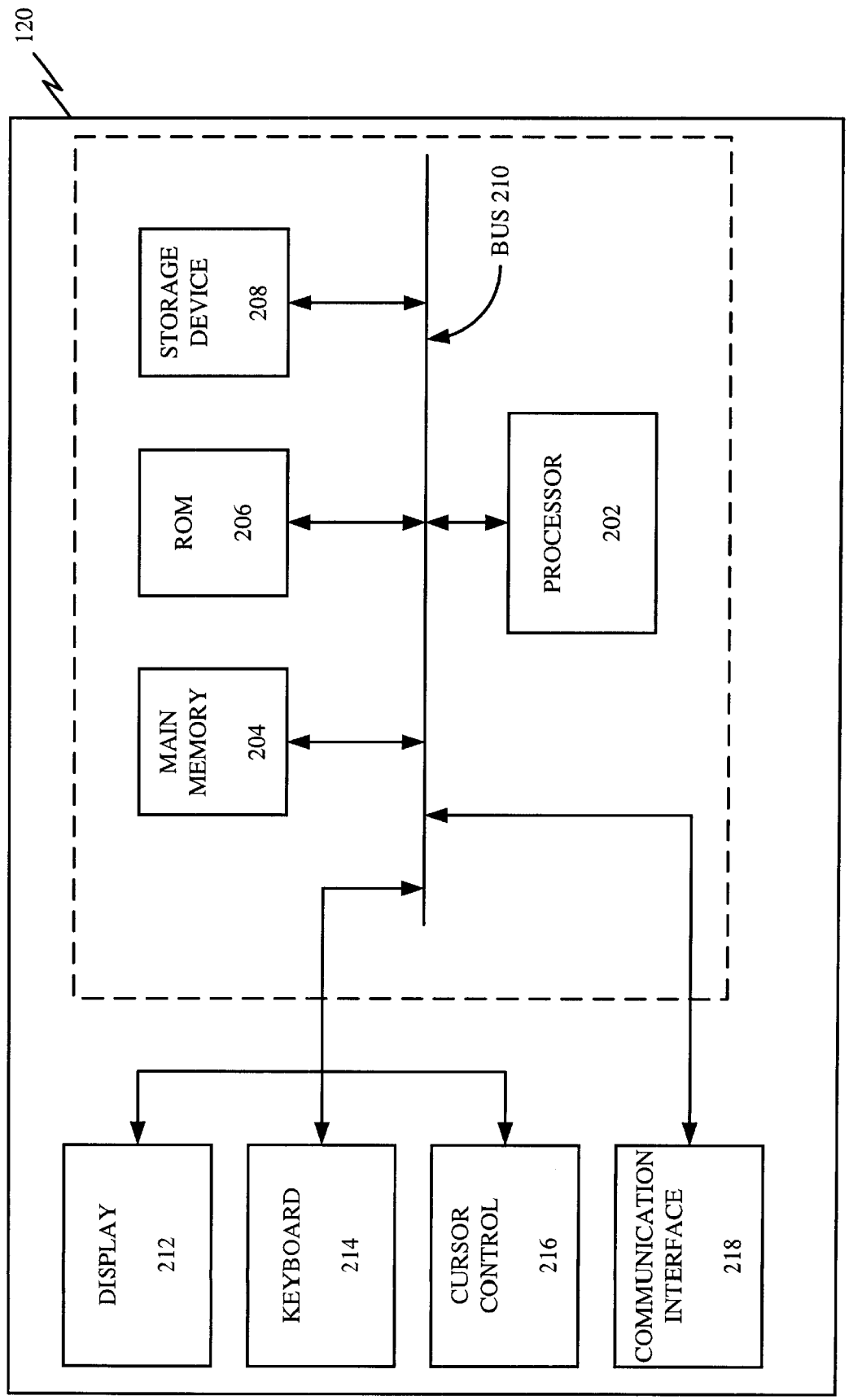
FIG. 2 illustrates an exemplary configuration of the VoIP service provider of FIG. 1.

FIG. 2 illustrates the VoIP service provider 120 in more detail. In FIG. 2, the exemplary VoIP service provider 120 includes a processor 202, main memory 204, read only memory (ROM) 206, storage device 208, bus 210, display 212, keyboard 214, cursor control 216, and communication interface 218.

The processor 202 may be any type of conventional processing device that interprets and executes instructions. Main memory 204 may be a random access memory (RAM) or a similar dynamic storage device. Main memory 204 stores information and instructions to be executed by processor 202. Main memory 204 may also be used for storing temporary variables or other intermediate information during execution of instructions by processor 202. ROM 206 stores static information and instructions for processor 202. It will be appreciated that ROM 206 may be replaced with some other type of static storage device. The data storage device 208 may include any type of magnetic or optical media and its corresponding interfaces and operational hardware. Data storage device 208 stores information and instructions for use by processor 202. Bus 210 includes a set of hardware lines (conductors, optical fibers, or the like) that allow for data transfer among the components of VoIP service provider 120.

The display device 212 may be a cathode ray tube (CRT), or the like, for displaying information to a user. The keyboard 214 and cursor control 216 allow the user to interact with the VoIP service provider 120. The cursor control 216 may be, for example, a mouse. In an alternative configuration, the keyboard 214 and cursor control 216 can be replaced with a microphone and voice recognition means to enable the user to interact with the VoIP service provider 120.

Communication interface 218 enables the VoIP service provider 120 to communicate with other devices/systems via any communications medium. For example, communication interface 218 may be a modem, an Ethernet interface to a LAN, or a printer interface. Alternatively, communication interface 218 can be any other interface that enables communication between the VoIP service provider 120 and other devices or systems.

As will be described in detail below, a VoIP service provider 120 consistent with the present invention provides a caller, operating a calling terminal 130, with the ability to make a telephone call over the network 110 at a subsidized rate. The VoIP service provider 120 performs operations necessary to complete the call in response to processor 202 executing sequences of instructions contained in, for example, memory 204. Such instructions may be read into memory 204 from another computer-readable medium, such as a data storage device 208, or from another device via communication interface 218. Execution of the sequences of instructions contained in memory 204 causes processor 202 to perform a method that will be described hereafter. For example, processor 202 may execute instructions to perform the functions of the authorization unit 121, authentication unit 122, accounting unit 123, and bill generation unit 124 and to establish telephone calls over the network 110. Alternatively, hard-wired circuitry may be used in place of or in combination with software instructions to implement the present invention. Thus, the present invention is not limited to any specific combination of hardware circuitry and software.

Exemplary Graphical User Interface Configuration

Figure 3:
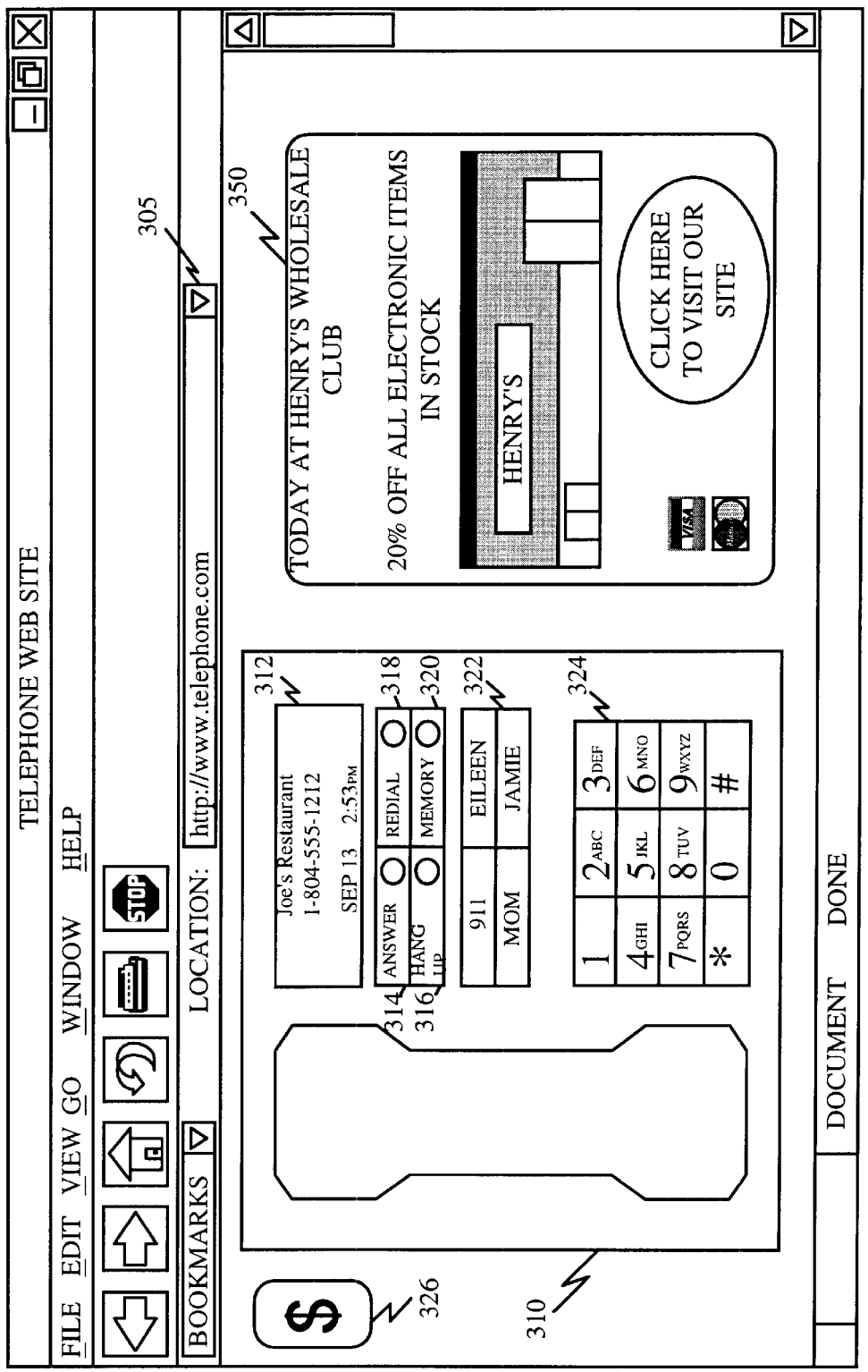
FIG. 3 illustrates an exemplary graphical user interface consistent with the present invention through which a subscriber interacts to make and receive subsidized telephone calls at a client terminal.

FIG. 3 illustrates an exemplary graphical user interface consistent with the present invention through which a subscriber interacts to make and receive subsidized telephone calls at a calling party terminal, such as calling party terminal 130. The exemplary graphical user interface, in the form of a web page, includes a Uniform Resource Locator (URL) entry slot 305, a graphical telephone interface 310, and an advertising section 350.

The URL entry slot 305 allows for entry of the URL that identifies the VoIP service provider 120 within data network 110. The graphical telephone interface 310 facilitates the making and receiving of telephone calls by providing the subscriber with an illustrative representation of a conventional telephone. By simply clicking on the graphical interface 310, the calling party can place telephone calls in the same manner as a conventional telephone.

The graphical telephone interface 310 includes a display 312, a set of functional buttons 314–320, a set of memory keys 322, a keypad 324, and a billing information button 326. The display 312 provides the subscriber with such information as the date and the time. The display 312 may also provide called party information in the event of an outgoing call or caller ID information in the event of an incoming call.

The functional buttons include an answer button 314, a hang up button 316, a redial button 318, and a memory button 320. The answer button 314 allows a subscriber to answer an incoming call. Clicking this button is similar to picking up a telephone handset or pushing an intercom button to answer an incoming call. The hang up button 316, when clicked, terminates an ongoing telephone call. The redial button 318 allows a subscriber to redial the last telephone number that was dialed using the graphical interface 310. The memory button 320 allows a subscriber to store a telephone number at one of the memory key locations 322. It will be appreciated that the exemplary graphical telephone interface 310 may include other function keys not illustrated in FIG. 3.

Each of the memory keys 322 allows the subscriber to automatically dial a telephone number associated therewith. For example, by clicking on the "911" memory key, a system consistent with the present invention connects the subscriber to a 911 operator. The keypad 324 allows the subscriber to dial a telephone number of interest.

The billing information button 326 provides the caller with a real-time billing status of the present call, or in the event of a collect call the called party is provided with a real-time billing status for the present call. Clicking on this button opens a pop-up window (not shown) that provides the current billing information. For example, the billing information window can display the call origination time, current time, present duration of call, and the present cost of the call. The billing information window can be set to update at user-defined intervals such as once per minute. If a caller is using free minutes for the call, the billing information window can be set to count down the minutes so that the caller knows when he will begin getting charged for the call.

It will be apparent to those knowledgeable in the art that the billing information button 326 can incorporate other features such as a duration alarm. Prior to making the call, the caller sets the duration alarm to a predetermined value, e.g. the desired number of minutes for the call or a desired price limit for the call. When the call is connected, the duration alarm automatically begins counting down in seconds or dollars. When the desired time or amount is reached, a visual or audible alarm sounds to notify the caller that the particular threshold has been reached. The duration alarm provides the caller with a convenient method for controlling the cost or duration of calls.

The billing information button can also be used to generate a monthly bill or a bill showing incurred charges, or free minutes used, for any period selected by the client.

The advertising section 350 of the web page provides the subscriber with an advertisement from one or more companies that are subsidizing the telephone call. Multiple advertisements may be displayed on the web page at one time or sequentially before, during, or after the telephone call. A subsidized telephone system consistent with the present invention may be set up such that the advertisements are continuously updated at predetermined intervals. The advertising copy "pushed" to the subscriber's terminal 130 may be based on geographical location, E.164 address, or known demographic or behavioral traits of the subscriber such as those gained through the use of collaborative filtering techniques, subscriber completed surveys, past purchasing behavior, and other activity monitoring methods commonly used in the art. Such information may be obtained from the subscriber when the subscriber registers for the subsidized telephone service.

Exemplary Process For Providing Subsidized Telephone Service

Figure 4A:
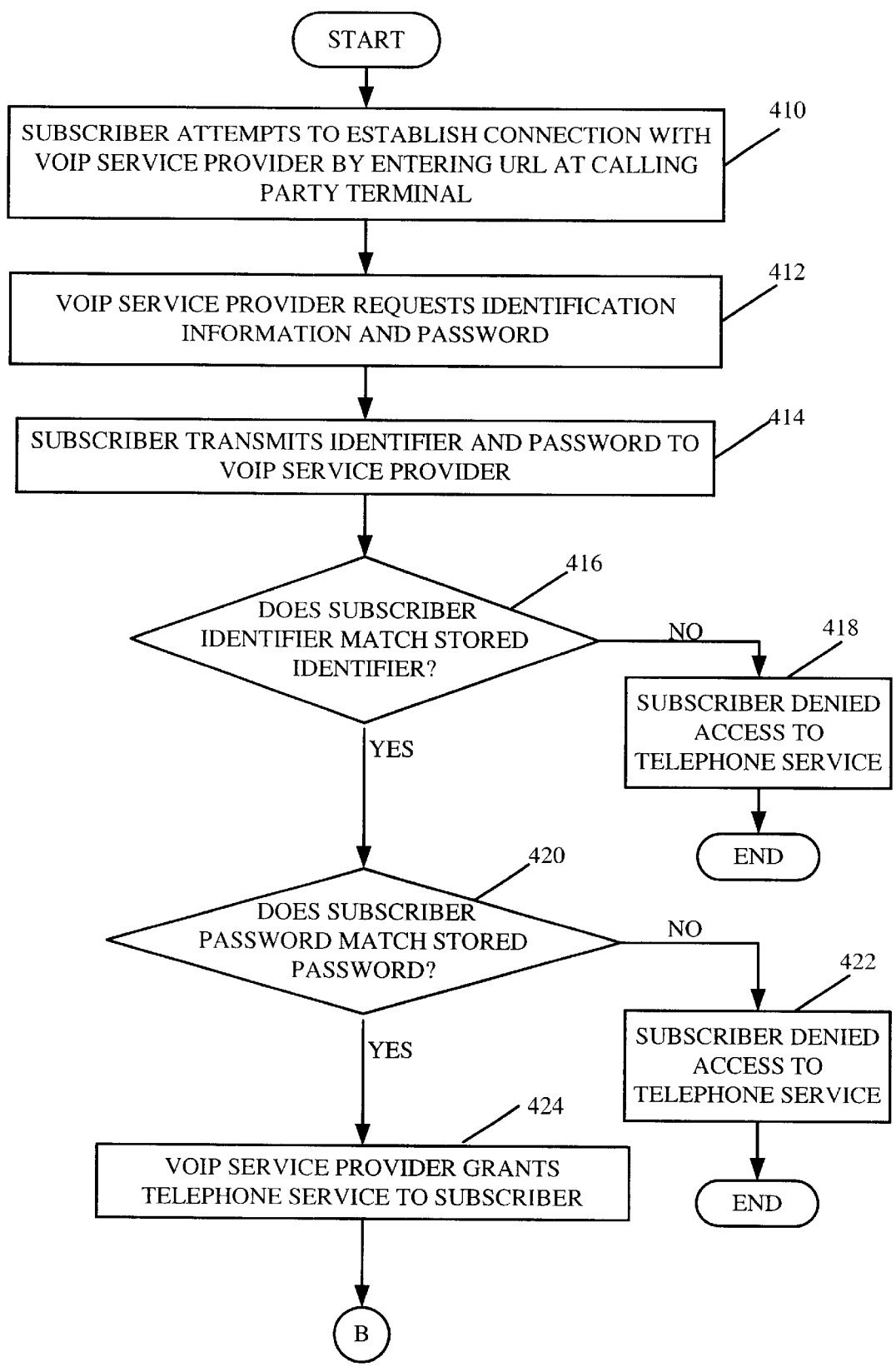
FIGS. 4A and 4B illustrate a method for providing subsidized telephone service consistent with the present invention.
Figure 4B:
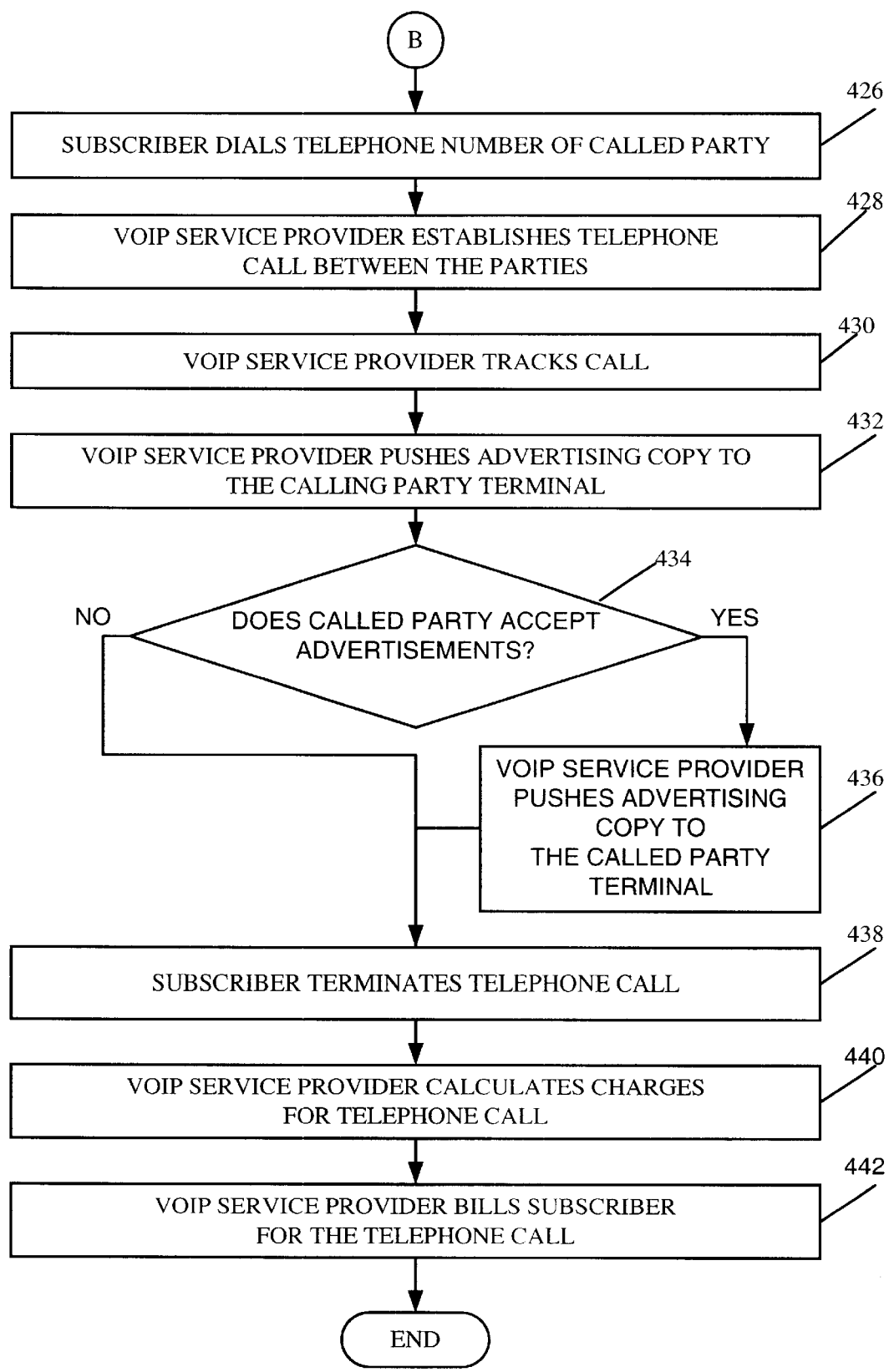

FIGS. 4A and 4B illustrate a method for providing subsidized telephone service consistent with the present invention. A subscriber, wanting to make a telephone call, establishes a connection with a VoIP service provider (e.g., VoIP service provider 120) by, for example, entering the URL for the service provider at a calling party terminal 130 (step 410).

In response, the VoIP service provider 120 requests the subscriber to enter identification information and a password (step 412). The subscriber enters the identification information and password into the calling party terminal 130 which transmits the data to the VoIP service provider 120 (step 414). The VoIP service provider's authorization unit 121 performs an authorization operation by, for example, comparing the subscriber's identification information to a list of previously registered identifiers (step 416). If the subscriber-provided identification information does not match an identifier in the list, then the VoIP service provider 120 notifies the subscriber of such and denies the subscriber access to the service provider's telephone service (step 418). If, on the other hand, the subscriber-provided identifier matches an identifier in the list, then the VoIP service provider's authentication unit 122 compares the subscriber-provided password with the password associated with the matching identifier at the VoIP service provider 120 (step 420). If the passwords do not match, then the VoIP service provider 120 notifies the subscriber of this fact and denies the subscriber access to the service provider's telephone service (step 422). If, on the other hand, the passwords match, then the VoIP service provider 120 permits the subscriber to use its telephone service and, as a result, displays a graphical user interface at the calling party terminal similar to the one depicted in FIG. 3 (step 424).

The subscriber then dials a telephone number of a called party by, for example, clicking on the numbers on keypad 324 (step 426). The VoIP service provider 120 establishes the call in a manner well known in the art between the subscriber at calling party terminal 130 and the called party at, for example, called party terminal 140 (step 428).

Upon completing the call, the VoIP service provider's accounting unit 123 begins a timer to track the duration of the call (step 430). During the call, the VoIP service provider 120 pushes advertising copy (e.g., advertisement 350) to the subscriber's terminal 130 (step 432). Next, the service provider determines if the called party terminal 140 accepts advertisements (step 434). If the called party terminal 140 does accept advertisements, then the service provider 120 pushes advertising copy to the called party terminal 140 (step 436). The advertising copy 350, as described above, may be updated at predetermined time intervals and may be from more than one subsidizing company.

Upon termination of the call (step 438), the VoIP service provider's accounting unit 123 determines the charges for the call based on such information as the duration of the call and the subsidized billing rate for the call (step 440). The accounting unit then transfers the result to the bill generation unit 124. The VoIP service provider 120 thereafter bills the subscriber for the call (step 442). In some instances, the call may be totally subsidized. In such an event, the subscriber would be so notified. In the event that the caller was using free minutes, the caller would be notified regarding the number of minutes used and the number of free minutes remaining.

Here it is noted that in the case of a collect call (not shown in FIG. 4B) service provider 120 determines if the called party terminal 140 has a valid account. If so, then authorization for the call is requested from the called party terminal 140 prior to completing the call. Then, service provider 120 tracks the call and pushes advertising copy to the called terminal 140 instead of the calling terminal. Next, service provider 120 determines if the calling party accepts advertisements, and if so, pushes advertising copy to the calling terminal. After the call is complete, the subscriber terminates the call and the VoIP service provider calculates the charges for the telephone call and provides a bill to the subscriber, here the party called.

Similar to advertising on the radio or television, companies wanting their advertisements displayed to consumers of this telephone service pay a specific advertising rate. The VoIP service provider uses this revenue to subsidize the cost of providing the VoIP service to consumers.

The amount of subsidization provided by the advertising companies may, in some instances, reduce the per minute charge to the subscriber to zero. The amount subsidized may be based on such things as the subscriber's known behavior or spending habits (e.g., a subscriber known to be highly influenced by web advertising or known to be a significant web-spender may get free service, or heavily subsidized service), the number of advertisements viewed during the call, and whether or not the called party accepts advertisements. Additionally, the user can bank subsidized minutes by having them posted to their account or, at the client's discretion, have them added to a calling card.

CONCLUSION

Systems and methods consistent with the present invention provide a mechanism by which consumers may make telephone calls at a subsidized billing rate. A service provider pushes advertising copy to a calling or receiving consumer's terminal before, during, and possibly after the telephone call is made. The revenue derived from providing the advertising to the consumer is used to subsidize the telephone call. Following the telephone call, the service provider calculates a bill for the consumer based on the subsidized billing rate.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while a subsidized telephone system and method are described above, it will be appreciated that the system and method of the present invention would apply equally well to other forms of communication, such as video conferencing, facsimile transmissions, e-mails, etc.

The following claims and their equivalents define the scope of the invention.

What is claimed is:

1. A method for subsidizing telephone calls over a digital network carrying VoIP traffic, said network including at least one client computer terminal and a VoIP service provider, said method comprising:

establishing a telephone call between the client computer terminal and a receiving terminal over the digital network;

causing the client computer terminal to display at least one advertisement during the telephone call;

determining whether the receiving terminal accepts advertisements;

causing the receiving terminal to display at least one other advertisement when the receiving terminal accepts advertisements;

determining a subsidized billing rate based on the display of the at least one advertisement at the client computer terminal and the display of the at least one other advertisement at the receiving terminal; and generating a bill for the telephone call based on the subsidized billing rate.

2. The method of claim 1 wherein the receiving terminal is a client computer terminal.

3. The method of claim 1 wherein an amount of subsidization is based on personal traits of a user of the client computer terminal.

4. The method of claim 1 wherein an amount of subsidization is based on advertising revenue derived from display of the at least one advertisement.

5. The method of claim 1 wherein said bill is generated for any period of time after inception of a client's account.

6. The method of claim 1 wherein a content of the at least one advertisement is based on a geographical location of the clients computer terminal and a telephone number of the client computer terminal.

7. The method of claim 1 wherein the displaying of the at least one advertisement occurs prior to and during the telephone call.

8. The method of claim 1 further comprising:

increasing a balance of an account associated with the client computer terminal by banking minutes prior to the current telephone call.

9. The method of claim 8 wherein the banked minutes are increased when advertising is accepted by the client computer terminal.

10. The method of claim 8 wherein the balance of banked minutes is increased by the client computer terminal clicking through at least one advertisement.

11. The method of claim 1 further comprising:

authorizing, prior to establishing the telephone call, the client computer terminal to place a telephone call.

12. The method of claim 1 wherein the telephone call is a collect call.

13. The method of claim 12 wherein the receiving terminal authorizes said collect call.

14. A system for subsidizing telephone calls over a VoIP network including at least one client computer terminal and a VoIP service provider, said system comprising:

means for establishing a telephone call between the client computer terminal and a receiving terminal over the VoIP network;

means for causing the client computer terminal to display at least one advertisement during the telephone call;

means for determining a subsidized billing rate based on the display of the at least one advertisement;

means for determining whether the receiving terminal accepts advertisements;

means for reducing the subsidized billing rate when the receiving terminal accepts advertisements; and means for generating a bill for the telephone call based on the reduced subsidized billing rate.

15. The system as in claim 14 wherein the client computer terminal displays the charges for at least one telephone call.

16. In a VoIP network including a first computer terminal for placing a telephone call over the network, a second computer terminal for receiving the telephone call from the first computer terminal, and a VoIP service provider, the service provider comprising:

a memory storing instructions for establishing the telephone call between the first and second computer terminals, for causing the first computer terminal to display at least one advertisement during the telephone call, for determining whether the second computer terminal accepts advertisements, for causing the second computer terminal to display at least one other advertisement during the telephone call when the second computer terminal accepts advertisements, for determining a subsidized billing rate based on the display of at least one advertisement on the first computer terminal and the display of at least one other advertisement on the second computer terminal, and for generating a bill of said telephone call based on the subsidized billing rate; and a processor for executing the instructions received from the memory.

17. The VoIp service provider of claim 16 wherein an amount of subsidization is based on personal traits of a user of the first computer terminal.

18. The VoIP service provider of claim 16 wherein an amount of subsidization is based on personal traits of a user of the second computer terminal.

19. The VoIP service provider of claim 16 wherein said bill is generated for any period of time after inception of a client's account.

20. The VoIP service provider of claim 16 wherein the subsidized billing rate is based on advertising revenue.

21. The VoIP service provider of claim 16 wherein a content of the at least one advertisement is based on a geographical location of the first computer terminal and a telephone number of the first terminal.

22. The VoIP service provider of claim 16 wherein a content of the at least one other advertisement is based on a geographical location of the second computer terminal and a telephone number of the second computer terminal.

23. The VoIP service provider of claim 16 where the memory is further configured to store instructions for causing at least one advertisement to be displayed on at least one of the computer terminals prior to and during the telephone. call.

24. A system for providing subsidized telephone service in a VoIP network having a plurality of calling computer terminals and called terminals, the system comprising:

a memory that stores data; and a processor, connected to the memory, that establishes a telephone call between a calling computer terminal and a called terminal, that causes at least one advertisement to be displayed at the called terminal during the telephone call, and that generates a bill for the called terminal based on a subsidized billing rate related to the display of the at least one advertisement.

25. The system of claim 24 wherein the processor is further configured to cause at least one advertisement to be displayed at the calling computer terminal during the telephone call.

26. The system of claim 24 wherein the telephone call is a collect call, comprising the step of:

authenticating the called terminal.

27. A method for determining the status of a subsidized telephone service account, the method comprising:

establishing a connection from a client computer terminal to a VoIP service provider:

verifying the existence of a valid client computer terminal account;

sending billing data from said VoIP service provider to said client computer terminal; and presenting billing data to a user of said client computer terminal.

28. A computer-readable medium containing instructions for controlling at least one processor to perform a method comprising:

establishing a telephone call from a calling computer terminal to a called terminal;

transmitting at least one advertisement during the telephone call to the calling computer terminal for display at the calling computer terminal;

determining whether the called terminal accepts advertisements;

transmitting at least one other advertisement during the telephone call to the called terminal for display at the called terminal when the called terminal accepts advertisements; and calculating a bill based on a subsidized billing rate related to the display of the at least one advertisement and the at least one other advertisement.

* * * * *